(12) United States Patent
Inoue et al.

(10) Patent No.: US 8,596,046 B2
(45) Date of Patent: Dec. 3, 2013

(54) EXHAUST PURIFICATION SYSTEM OF INTERNAL COMBUSTION ENGINE

(75) Inventors: Mikio Inoue, Susono (JP); Kohei Yoshida, Gotenba (JP); Yuki Bisaiji, Mishima (JP); Kazuhiro Umemoto, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/262,865

(22) PCT Filed: May 20, 2010

(86) PCT No.: PCT/JP2010/058953
§ 371 (c)(1),
(2), (4) Date: Oct. 4, 2011

(87) PCT Pub. No.: WO2011/145228
PCT Pub. Date: Nov. 24, 2011

(65) Prior Publication Data
US 2013/0074475 A1    Mar. 28, 2013

(51) Int. Cl.
*F01N 3/00* (2006.01)
(52) U.S. Cl.
USPC .................. 60/295; 60/274; 60/299; 60/301
(58) Field of Classification Search
USPC .................................................. 60/274–324
See application file for complete search history.

(56) References Cited

U.S. PATENT DOCUMENTS

| | | | | |
|---|---|---|---|---|
| 7,213,395 B2 * | 5/2007 | Hu et al. | .......................... | 60/286 |
| 7,650,746 B2 * | 1/2010 | Hu et al. | .......................... | 60/286 |
| 2007/0271908 A1 * | 11/2007 | Hemingway et al. | ........... | 60/286 |
| 2010/0236224 A1 * | 9/2010 | Kumar et al. | .................... | 60/297 |
| 2010/0242448 A1 * | 9/2010 | Mital | .............................. | 60/286 |

FOREIGN PATENT DOCUMENTS

| | | |
|---|---|---|
| JP | A-2002-188429 | 7/2002 |
| JP | A-2006-274986 | 10/2006 |
| JP | B2-3969450 | 9/2007 |
| WO | WO 2006/008625 A1 | 1/2006 |

OTHER PUBLICATIONS

Aug. 24, 2010 Search Report issued in International Patent Application No. PCT/JP/2010/058942.

U.S. Appl. No. 13/264,649, filed Oct. 14, 2011, in the name of Inoue et al.

International Search Report issued in Application No. PCT/JP2010/058953; Dated Aug. 24, 2010 (With Translation).

* cited by examiner

*Primary Examiner* — Kenneth Bomberg
*Assistant Examiner* — Jesse Bogue
(74) *Attorney, Agent, or Firm* — Oliff & Berridge, PLC

(57) ABSTRACT

In an internal combustion engine, inside of an engine exhaust passage, a hydrocarbon feed valve (16), an exhaust purification catalyst (13), an aqueous urea solution feed valve (17), and an $NO_x$ selective reduction catalyst (15) are arranged in that order. A first $NO_x$ purification method which makes the concentration of hydrocarbons flowing into the exhaust purification catalyst (13) vibrate by within predetermined ranges of amplitude and period to reduce the $NO_x$, which is contained in exhaust gas in the exhaust purification catalyst (13) and a second $NO_x$ purification method which uses the fed aqueous urea solution to reduce the $NO_x$ in the $NO_x$ selective reduction catalyst (15) are selectively used.

11 Claims, 15 Drawing Sheets

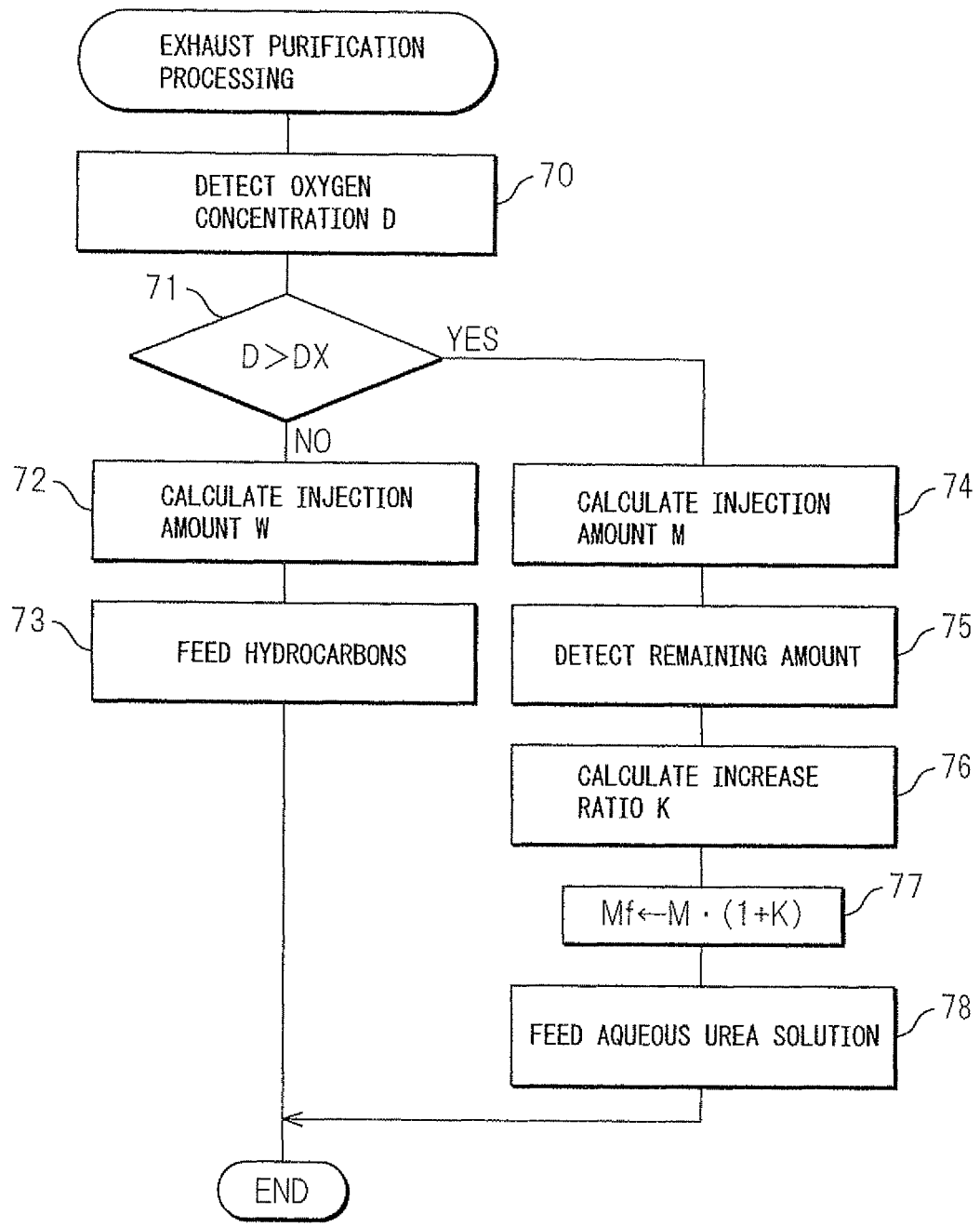

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which enables a high $NO_x$ purification rate to be obtained even if the temperature of the exhaust purification catalyst becomes a high temperature and which enables a high $NO_x$ purification rate to be obtained even if the oxygen concentration in the exhaust gas becomes high.

Solution to Problem

According to the present invention, there is provided an exhaust purification system of an internal combustion engine wherein an exhaust purification catalyst for reacting $NO_x$ contained in exhaust gas and reformed hydrocarbons is arranged inside of an engine exhaust passage, aqueous urea solution feeding means and an $NO_x$ selective reduction catalyst able to reduce $NO_x$ by ammonia derived from an aqueous urea solution fed are arranged inside of the engine exhaust passage downstream of the exhaust purification catalyst, a precious metal catalyst is carried on an exhaust gas flow surface of the exhaust purification catalyst and a basic exhaust gas flow surface part is formed amount the previous metal catalyst, the exhaust purification catalyst has a property of reducing the $NO_x$ which is contained in exhaust gas if a concentration of hydrocarbons flowing into the exhaust purification catalyst is made to vibrate by within a predetermined range of amplitude and within a predetermined range of period and has a property of being increased in storage amount of $NO_x$ which is contained in exhaust gas if the vibration period of the hydrocarbon concentration is made longer than the predetermined range, and, at the time of engine operation, either method of a first $NO_x$ purification method which makes the concentration of hydrocarbons flowing into the exhaust purification catalyst vibrate by within the predetermined range of amplitude and within the predetermined range of period so as to reduce the $NO_x$ which is contained in exhaust gas in the exhaust purification catalyst and a second $NO_x$ purification method which uses the ammonia derived from the fed aqueous urea solution to reduce the $NO_x$ which is contained in exhaust gas at the $NO_x$ selective reduction catalyst is selectively used.

Advantageous Effects of Invention

Even if the temperature of the exhaust purification catalyst becomes a high temperature, a high $NO_x$ purification rate can be obtained. Further, by selectively using the first $NO_x$ purification method and the second $NO_x$ purification method in accordance with the oxygen concentration in the exhaust gas, it is possible to obtain a high $NO_x$ purification rate even if the oxygen concentration in the exhaust gas changes.

BRIEF DESCRIPTION OF DRAWINGS

FIG. 24 is a flow chart for exhaust purification control.

DESCRIPTION OF EMBODIMENTS

Figure 1:
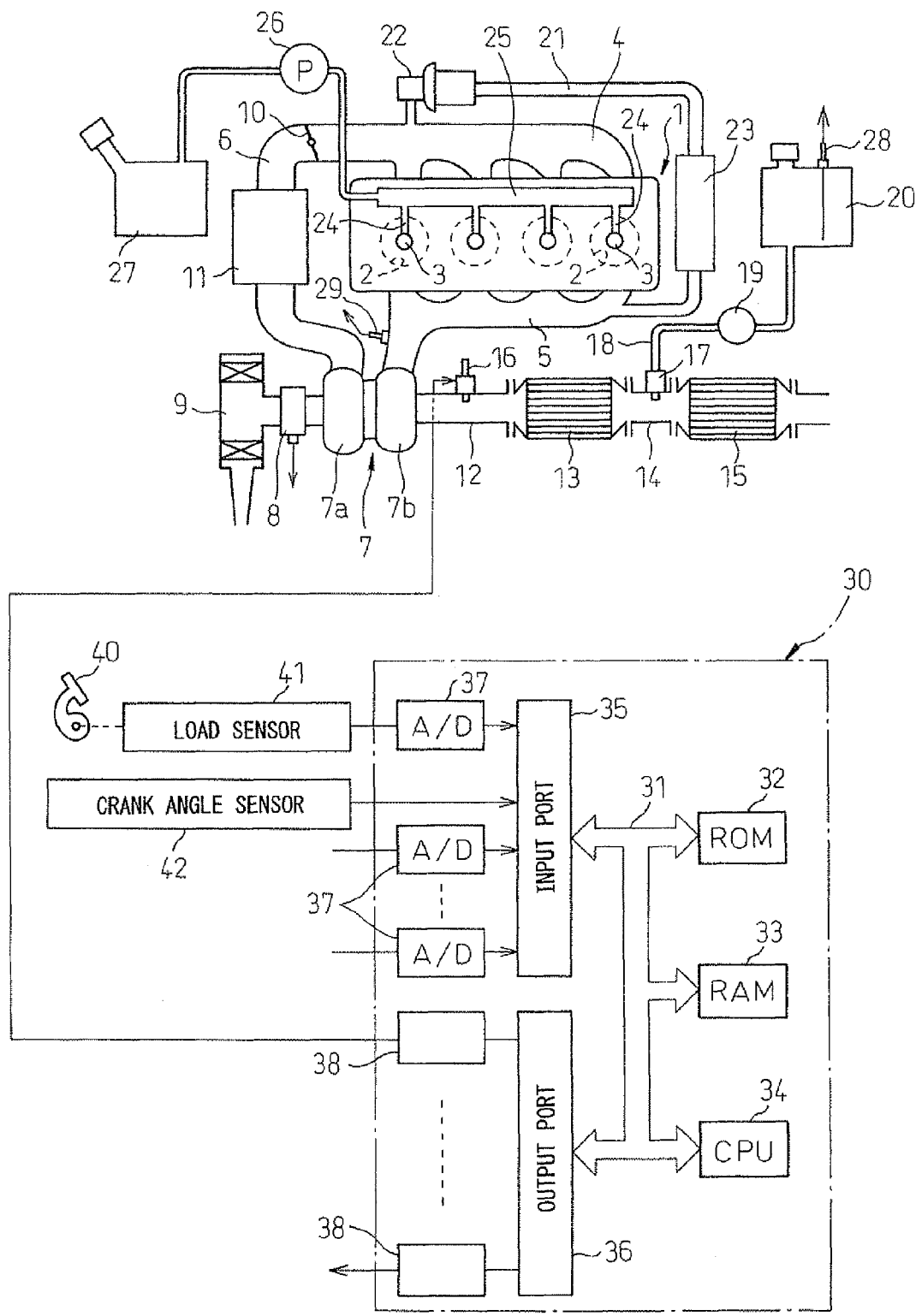
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13. The outlet of the exhaust purification catalyst 13 is connected to an $NO_x$ selective reduction catalyst 15 which is able to reduce $NO_x$ which is contained in exhaust gas in the presence of ammonia through the exhaust pipe 14. Inside of the exhaust pipe 12 upstream of the exhaust purification catalyst 13, a hydrocarbon feed valve 16 is arranged for feeding hydrocarbons comprised of diesel oil or other fuel used as fuel of a compression ignition type internal combustion engine. In the embodiment shown in FIG. 1, diesel oil is used as the hydrocarbons which are fed from the hydrocarbon feed valve 16. Note that, the present invention can also be applied to a spark ignition type internal combustion engine which burns fuel under a lean air-fuel ratio. In this case, hydrocarbons comprised of gasoline or other fuel which is used as fuel of a spark ignition type internal combustion engine are fed from the hydrocarbon feed valve 16.

Aqueous urea solution feeding means, for example, an aqueous urea solution feed valve 17, is arranged inside the exhaust pipe 14 upstream of the $NO_x$ selective reduction catalyst 15. This aqueous urea solution feed valve 17 is connected through a feed pipe 18 and feed pump 19 to an aqueous urea solution tank 20. The aqueous urea solution which is stored inside the aqueous urea solution tank 20 is injected into the exhaust gas flowing through the inside of the exhaust pipe 14 from the aqueous urea solution feed valve 17 by the feed pump 19. Due to the ammonia generated from the urea $((NH_2)_2CO+H_2O \rightarrow 2NH_3+CO_2)$, the $NO_x$ which is contained in exhaust gas is reduced in the $NO_x$ selective reduction catalyst 15. In this embodiment shown in FIG. 1, this $NO_x$ selective reduction catalyst 15 is comprised of Fe zeolite.

On the other hand, the exhaust manifold 5 and the intake manifold 4 are connected with each other through an exhaust gas recirculation (hereinafter referred to as an "EGR") passage 21. Inside the EGR passage 21, an electronically controlled EGR control valve 22 is arranged. Further, around the EGR passage 21, a cooling device 23 is arranged for cooling EGR gas flowing through the inside of the EGR passage 21. In the embodiment shown in FIG. 1, the engine cooling water is guided to the inside of the cooling device 23 where the engine cooling water is used to cool the EGR gas. On the other hand, each fuel injector 3 is connected through a fuel feed tube 24 to a common rail 25. This common rail 25 is connected through an electronically controlled variable discharge fuel pump 26 to a fuel tank 27. The fuel which is stored inside of the fuel tank 27 is fed by the fuel pump 26 to the inside of the common rail 25. The fuel which is fed to the inside of the common rail 25 is fed through each fuel feed tube 24 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Inside the aqueous urea solution tank 20, a level sensor 28 is arranged for detecting the liquid level of the aqueous urea solution which is stored inside the aqueous urea solution tank 20. An oxygen concentration sensor 29 is arranged at the collecting portion of the exhaust manifold 5. The output signals of these level sensor 28, oxygen concentration sensor 29, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 16, aqueous urea solution feed valve 17, feed pump 19, EGR control valve 22, and fuel pump 26.

Figure 2:
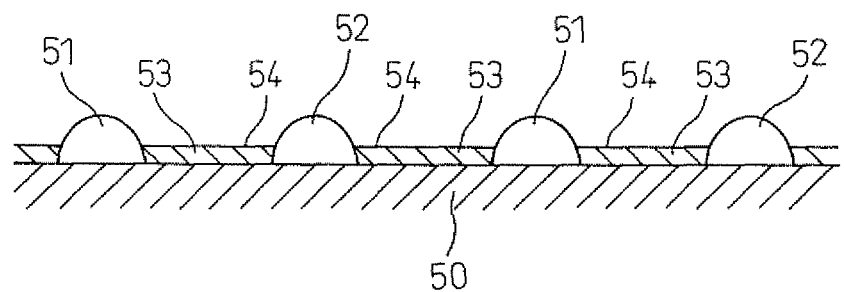
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
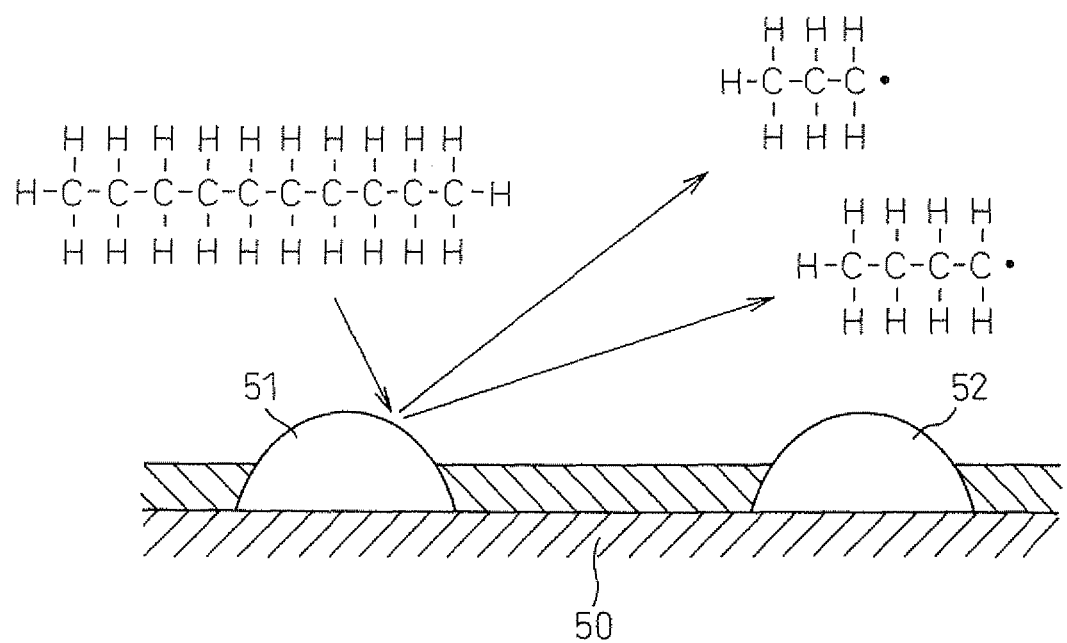
FIG. 3 is a view for explaining an oxidation reaction in an exhaust purification catalyst.

If hydrocarbons are injected from the hydrocarbon feed valve 16 into the exhaust gas, the hydrocarbons are reformed in the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 16 become radical hydrocarbons HC with a small carbon number due to the catalyst 51.

Note that, even if injecting fuel, that is, hydrocarbons from the fuel injector 3 into the combustion chamber 2 during the second half of the expansion stroke or exhaust stroke, the hydrocarbons are reformed inside the combustion chamber 2 or in the exhaust purification catalyst 13. The $NO_x$ which is contained in exhaust gas is removed by the reformed hydrocarbons at the exhaust purification catalyst 13. Therefore, in the present invention, instead of feeding hydrocarbons from the hydrocarbon feed valve 16 to the inside of an engine exhaust passage, it is possible to feed hydrocarbons into the combustion chamber 2 in the second half of the expansion stroke or exhaust stroke. In this way, in the present invention, it is also possible to feed hydrocarbons to the inside of the combustion chamber 2, but below the case of injecting hydrocarbons from the hydrocarbon feed valve 16 to the inside of an engine exhaust passage will be used as an example to explain the present invention.

Figure 4:
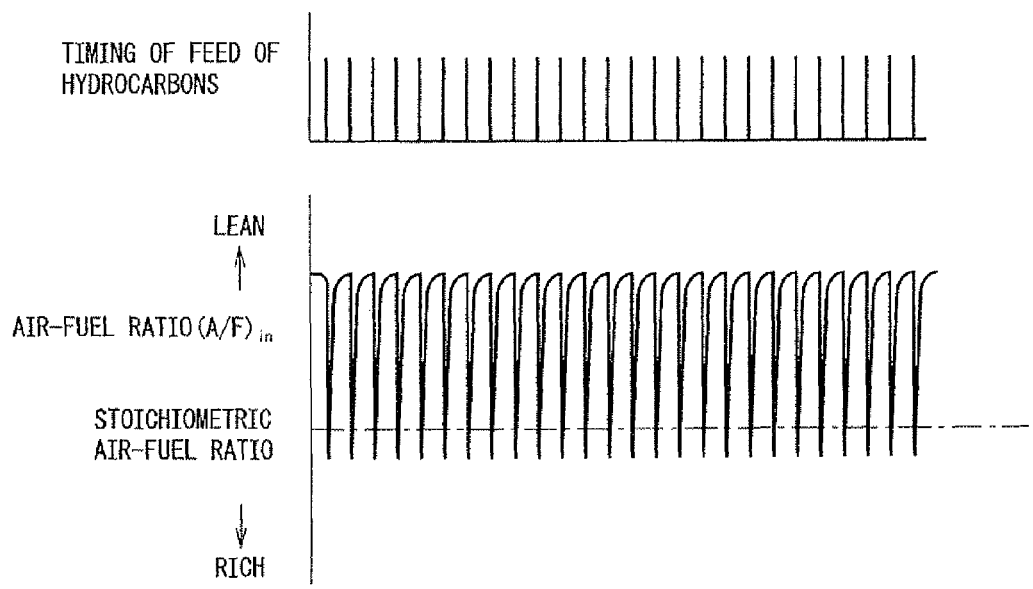
FIG. 4 is a view showing a change of an air-fuel ratio of exhaust gas flowing into an exhaust purification catalyst.

FIG. 4 shows the timing of feeding hydrocarbons from the hydrocarbon feed valve 16 and the changes in the air-fuel ratio (A/F)in of the exhaust gas flowing to the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
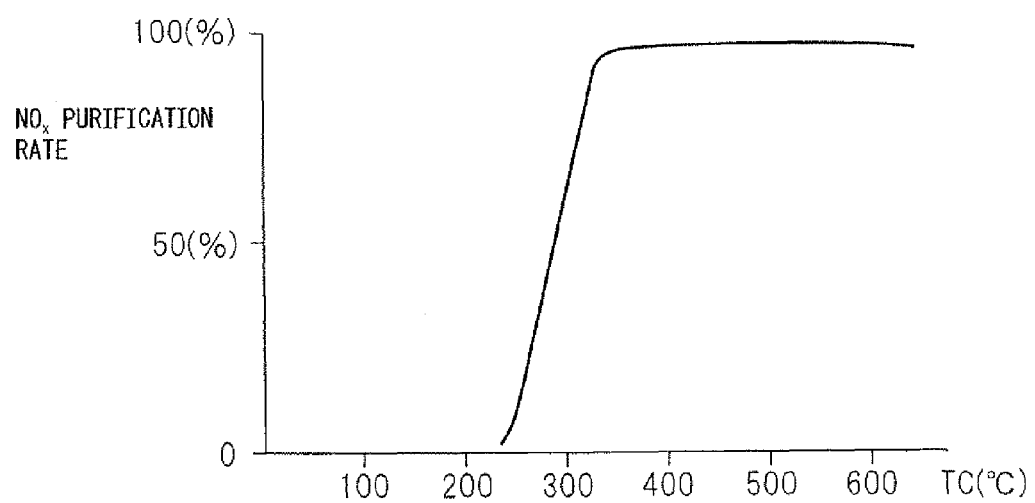
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
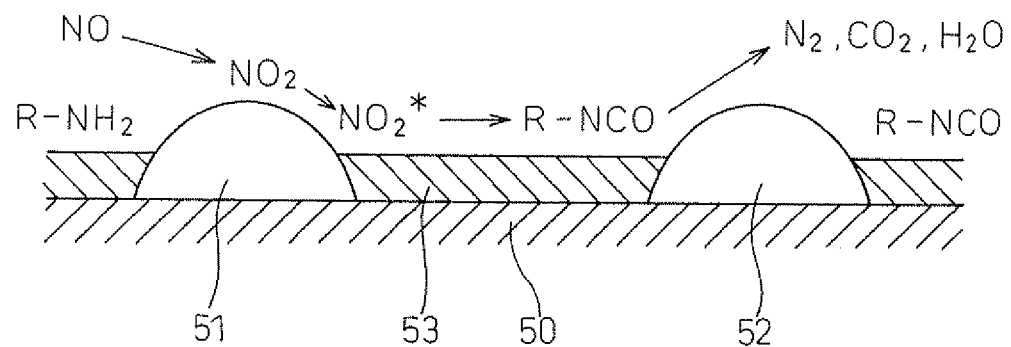
FIGS. 6A and 6B are views for explaining an oxidation reduction reaction in an exhaust purification catalyst.
Figure 6B:
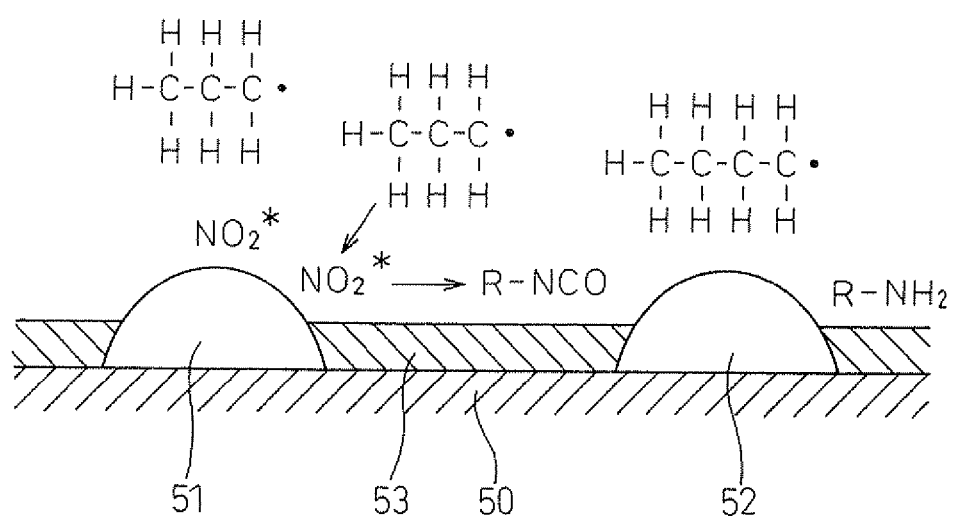

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 16 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 16, as shown in FIG. 3, the hydrocarbons are reformed and become radicalized inside of the exhaust purification catalyst 13. As a result, as shown in FIG. 6B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3$. However, if the hydrocarbon concentration around the active $NO_2^*$ is made higher before this predetermined time passes, as shown in FIG. 6B, the active $NO_2^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_2^*$ will react. At this time, the active $NO_2^*$ reacts with the reducing intermediate R—NCO or R—$NH_2$ to form $N_2$, $CO_2$, and $H_2O$ and consequently the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_2$* reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2$*. That is, the concentration of hydrocarbons flowing into the exhaust purification catalyst 13 has to be made to vibrate within a predetermined range of amplitude. Note that, in this case, a sufficient amount of reducing intermediate R—NCO or R—$NH_2$ has to be held on the basic layer 53, that is, on the basic exhaust gas flow surface part 24, until the produced reducing intermediate reacts with the active $NO_2$*. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_2$* is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. $NO_x$ is reduced by the reducing action of the reducing intermediate R—NCO or R—$NH_2$ held on the basic exhaust gas flow surface part 54, and the vibration period of the hydrocarbon concentration is made the vibration period required for continued production of the reducing intermediate R—NCO or R—$NH_2$. Incidentally, in the example shown in FIG. 4, the injection interval is made 3 seconds.

Figure 7A:
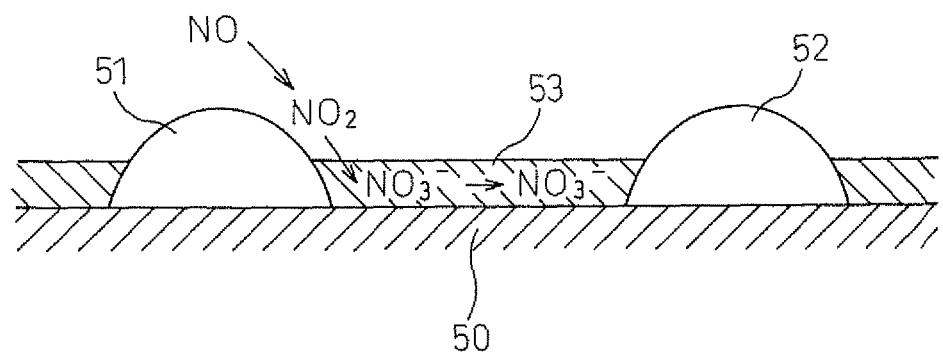
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_2$* which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
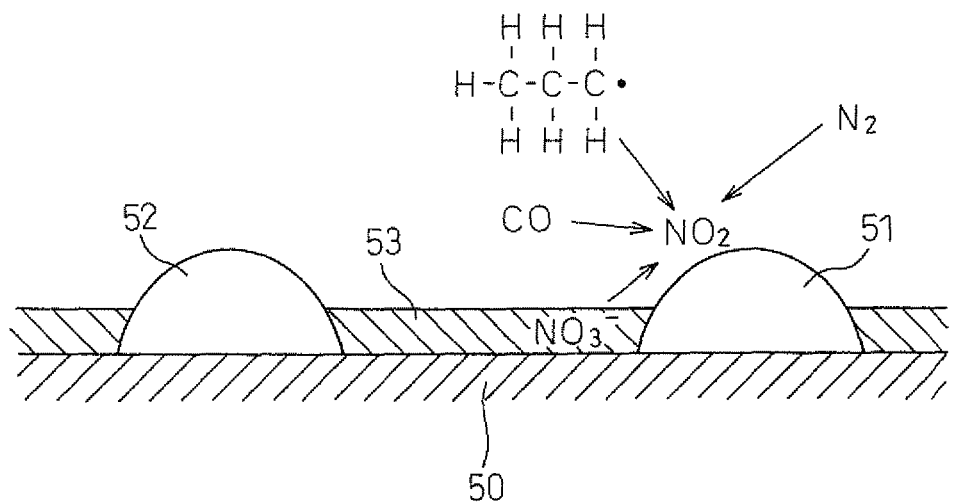

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
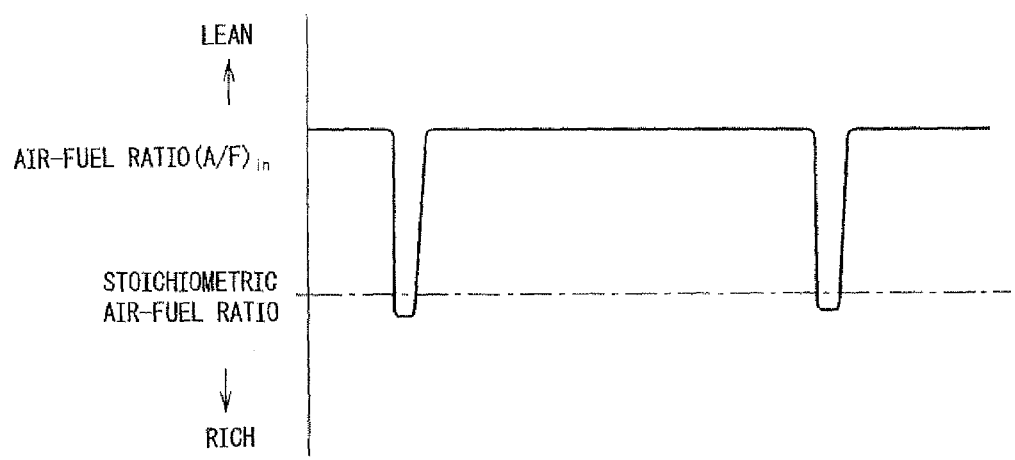
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if referring to the ratio of the air and fuel (hydrocarbons) which are supplied into the engine intake passage, combustion chambers 2, and exhaust passage upstream of the exhaust purification catalyst 13 as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
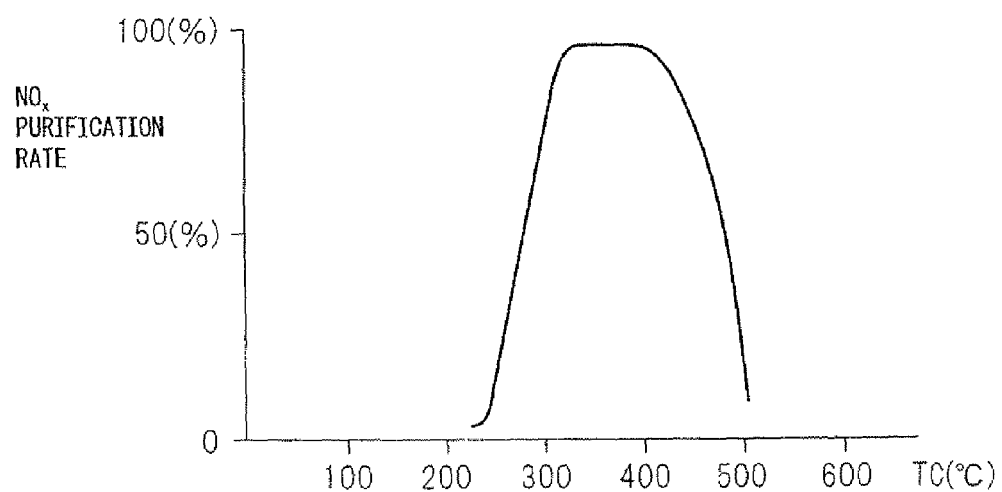
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, an exhaust purification catalyst 13 for reacting $NO_x$ contained in exhaust gas and reformed hydrocarbons is arranged inside of an engine exhaust passage. Precious metal catalysts 51 and 52 are carried on the exhaust gas flow surface of the exhaust purification catalyst 13. Around the precious metal catalysts 51 and 52, a basic exhaust gas flow surface part 54 is formed. The exhaust purification catalyst 13 has the property of reducing the $NO_x$ which is contained in exhaust gas if making the concentration of hydrocarbons flowing into the exhaust purification catalyst 13 vibrate by within a predetermined range of amplitude and within a predetermined range of period and has the property of being increased in storage amount of $NO_x$ which is contained in exhaust gas if the vibration period of the hydrocarbon concentration is made longer than this predetermined range, and, under a certain operating state of the engine, the concentration of hydrocarbons flowing into the exhaust purification catalyst 13 is made to vibrate within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. This new $NO_x$ purification method will be called the first $NO_x$ purification method below.

Next, referring to FIG. 10 to FIG. 15, this first $NO_x$ purification method will be explained in a bit more detail.

Figure 10:
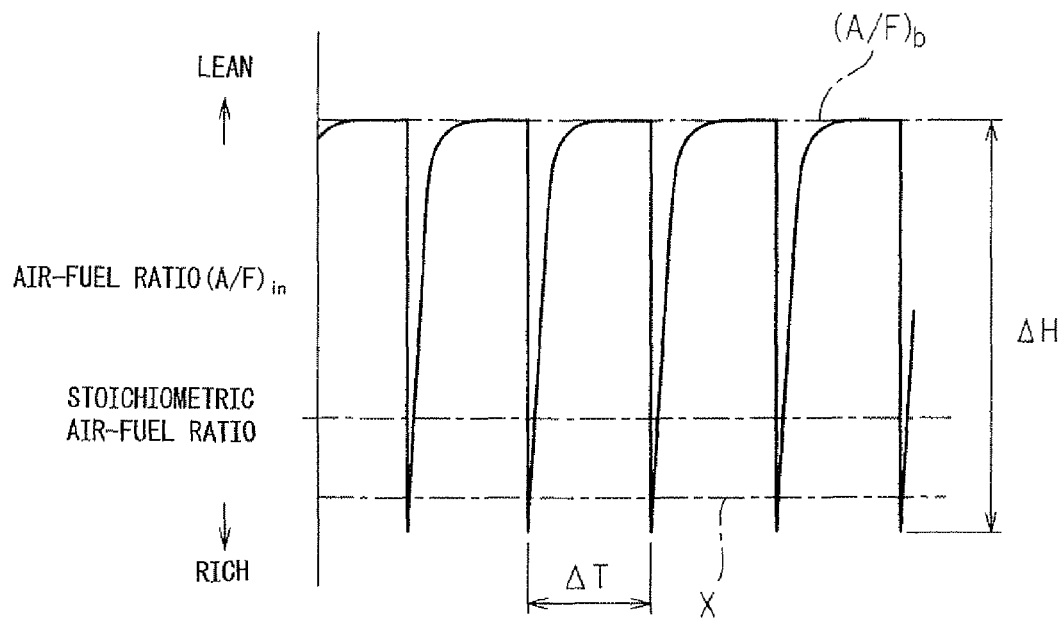
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in which is used for producing the reducing intermediate without the produced active $NO_2$* being stored in the form of nitrates inside the basic layer 53. To make the active $NO_2$ and the reformed hydrocarbons react and produce the reducing intermediate, it is necessary to make the air-fuel ratio (A/F)in lower than the upper limit X of this air-fuel ratio.

In other words, in FIG. 10, X shows the lower limit of the concentration of hydrocarbons required for making the active $NO_2$* and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2$*, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
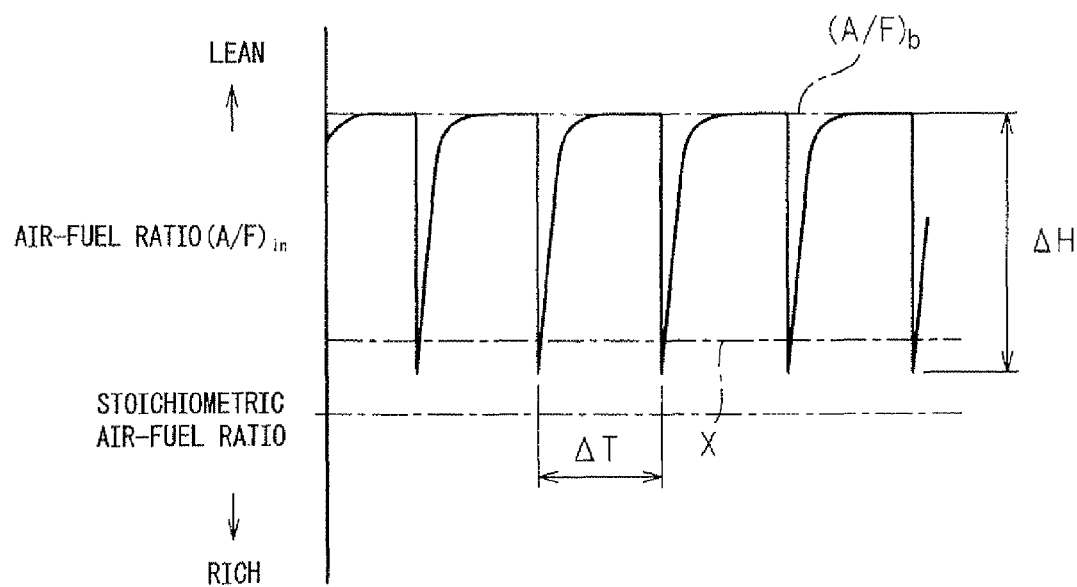
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
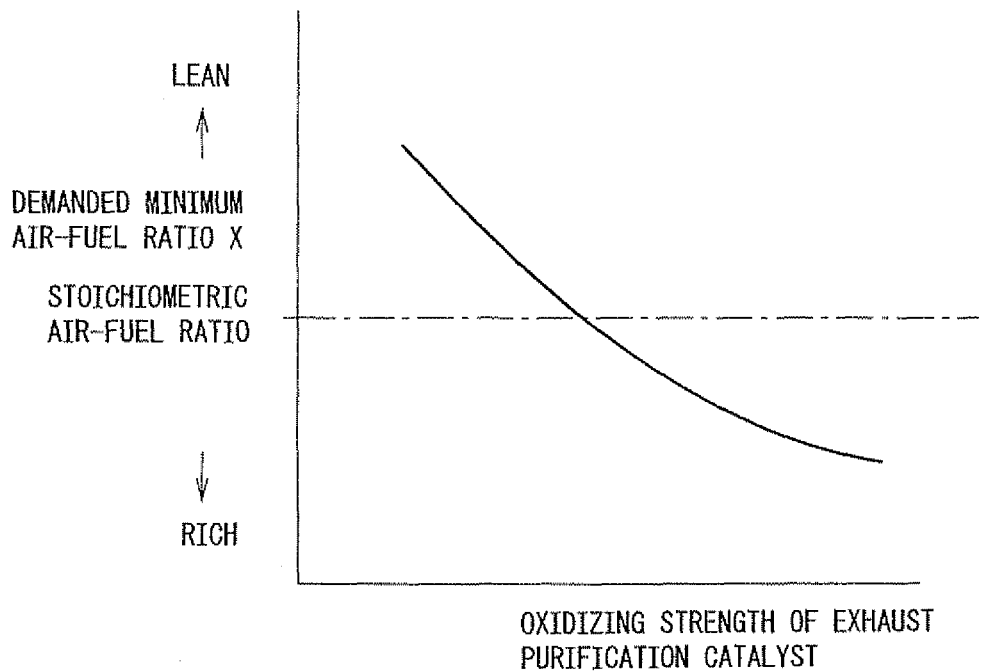
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
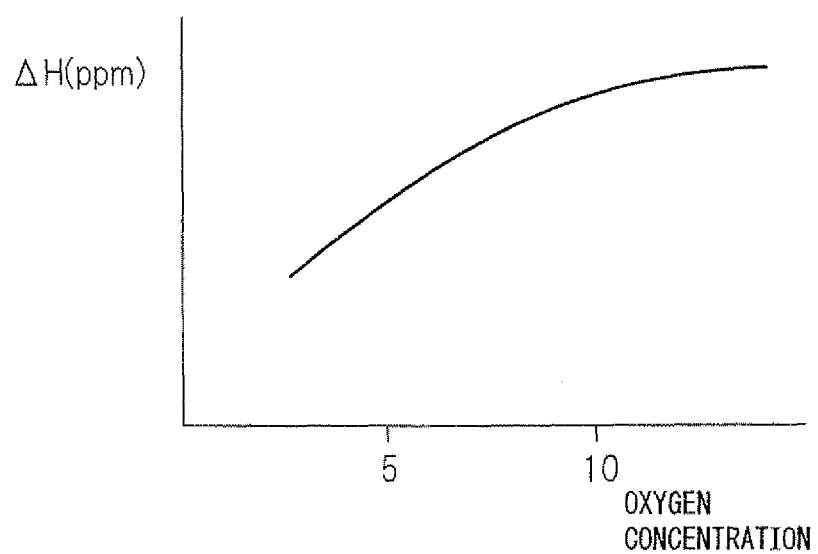
FIG. 13 is a view showing a relationship between an oxygen concentration in exhaust gas and an amplitude $\Delta H$ of a hydrocarbon concentration giving the same $NO_x$ purification rate.

FIG. 13 shows the relationship between the oxygen concentration in the exhaust gas before the hydrocarbons are fed and the amplitude ΔH of the hydrocarbon concentration when the same $NO_x$ purification rate is obtained. From FIG. 13, it is learned, to obtain the same $NO_x$ purification rate, that the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio (A/F)b, the greater the amplitude ΔT of the hydrocarbon concentration has to be made. In other words, to remove the $NO_x$ well, the lower the base air-fuel ratio (A/F)b, the more the amplitude ΔT of the hydrocarbon concentration can be reduced.

Figure 14:
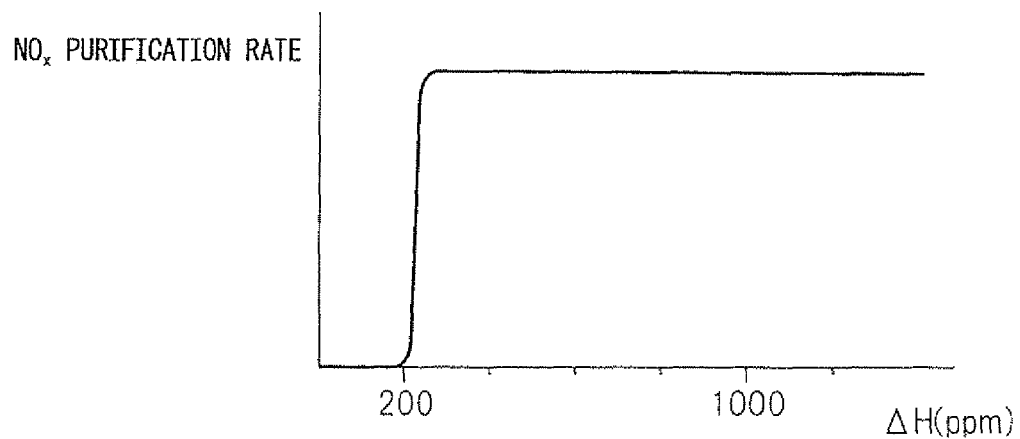
FIG. 14 is a view showing a relationship between an amplitude $\Delta H$ of a hydrocarbon concentration and an $NO_x$ purification rate.

In this regard, the base air-fuel ratio $(A/F)_b$ becomes the lowest at the time of an acceleration operation. At this time, if the amplitude ΔH of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude ΔH of the hydrocarbon concentration is 200 ppm or more, an excellent $NO_x$ purification rate can be obtained.

On the other hand, it is learned that when the base air-fuel ratio (A/F)b is the highest, if making the amplitude ΔH of the hydrocarbon concentration 10000 ppm or so, an excellent $NO_x$ purification rate is obtained. Further, if the amplitude ΔH of the hydrocarbon concentration is over 10000 ppm, there is the danger that the air-fuel ratio (A/F)in will become rich. Therefore, there is the danger that the first $NO_x$ purification method can no longer be performed. Therefore, in the present invention, the predetermined range of the amplitude of the hydrocarbon concentration is made 200 ppm to 10000 ppm.

Figure 15:
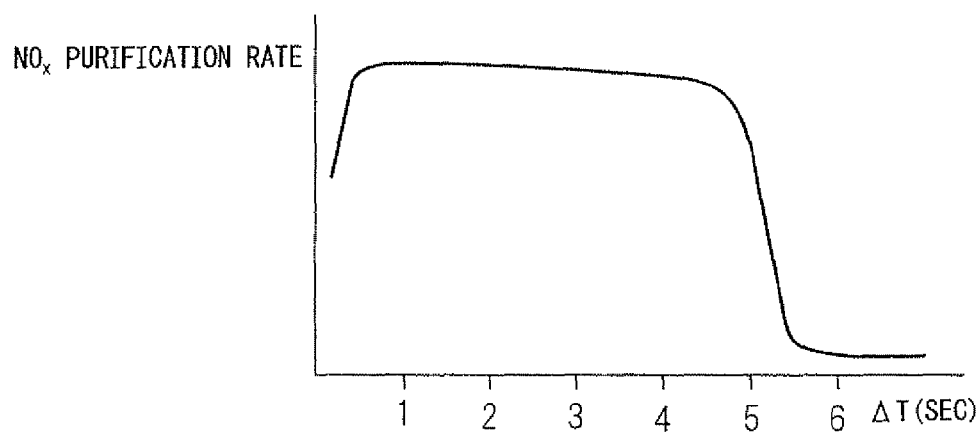
FIG. 15 is a view showing a relationship of a vibration period $\Delta T$ of a hydrocarbon concentration and an $NO_x$ purification rate.

Further, if the vibration period ΔT of the hydrocarbon concentration becomes longer, the oxygen concentration around the active $NO_2$* becomes higher in the time after the hydrocarbons are fed to when the hydrocarbons are next fed. In this case, if the vibration period ΔT of the hydrocarbon concentration becomes longer than about 5 seconds, the active $NO_2$* starts to be absorbed in the form of nitrates inside the basic layer 53. Therefore, as shown in FIG. 15, if the vibration period ΔT of the hydrocarbon concentration becomes longer than about 5 seconds, the $NO_x$ purification rate falls. Therefore, the vibration period ΔT of the hydrocarbon concentration has to be made 5 seconds or less.

On the other hand, if the vibration period ΔT of the hydrocarbon concentration becomes about 0.3 second or less, the fed hydrocarbons start to build up on the exhaust gas flow surface of the exhaust purification catalyst 13, therefore, as shown in FIG. 15, if the vibration period ΔT of the hydrocarbon concentration becomes about 0.3 second or less, the $NO_x$ purification rate falls. Therefore, in the present invention, the vibration period of the hydrocarbon concentration is made from 0.3 second to 5 seconds.

Figure 16:
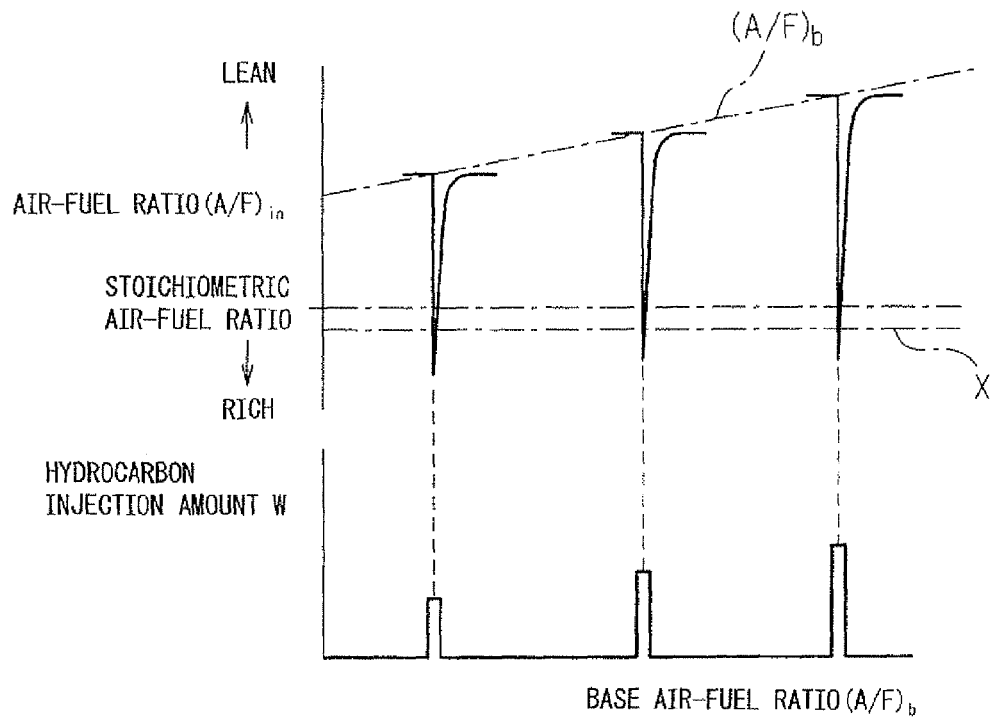
FIG. 16 is a time chart showing changes in an air-fuel ratio of exhaust gas flowing into an exhaust purification catalyst etc.
Figure 17:
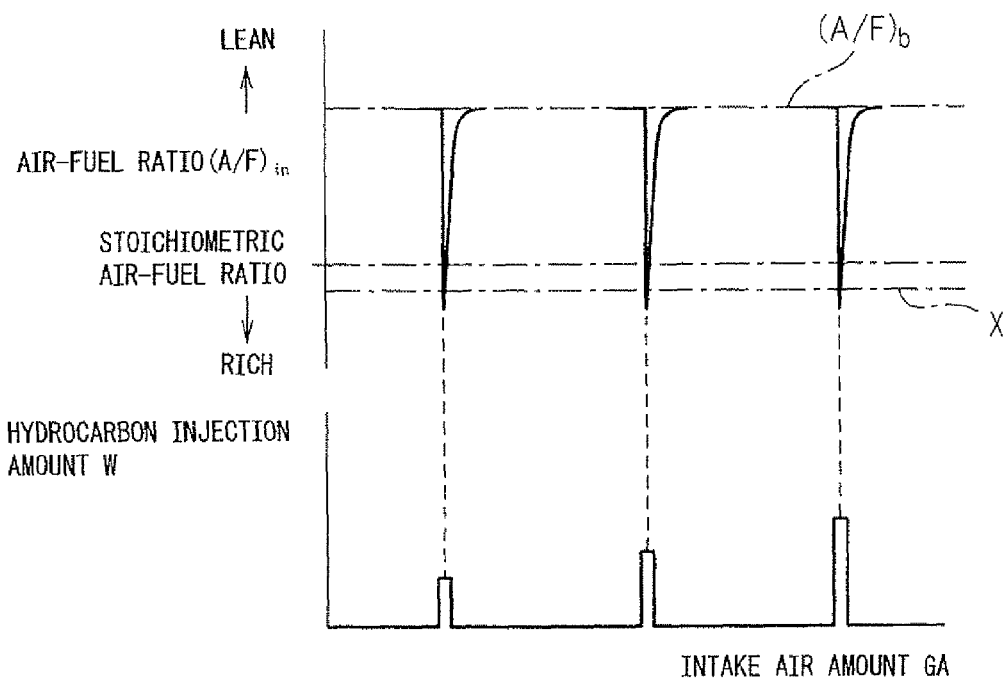
FIG. 17 is a time chart showing the changes in the air-fuel ratio of the exhaust gas flowing into the exhaust purification catalyst etc.

Now, in this embodiment according to the present invention, by changing the injection amount and injection timing of hydrocarbons from the hydrocarbon feed valve 15, the amplitude ΔH and vibration period ΔT of the hydrocarbon concentration is controlled so as to become the optimum values in accordance with the engine operating state. FIG. 16 and FIG. 17 show changes in the optimum hydrocarbon concentration in accordance with the engine operating state and the injection amount of hydrocarbons W from the hydrocarbon feed valve 16 causing these changes. Note that, FIG. 16 shows the case where the base air-fuel ratio (A/F)b is changed, while FIG. 17 shows the case where the intake air amount GA, that is, exhaust gas amount, is changed.

As explained above, to remove the $NO_x$ well, as shown in FIG. 16, the amplitude of the hydrogen concentration has to be increased as the base air-fuel ratio $(A/F)_b$ becomes higher. To make the amplitude of the hydrocarbon concentration larger, it is necessary to increase the injection amount of hydrocarbons W. Therefore, in this embodiment according to the present invention, the higher the base air-fuel ratio (A/F)b, the greater the injection amount of hydrocarbons W is made.

On the other hand, when the base air-fuel ratio (A/F)b is constant and under this a fixed amount of hydrocarbons is fed, if the intake air amount GA increases, that is, if the exhaust gas amount increases, the hydrogen concentration in the exhaust gas will fall. In this case, to maintain the hydrogen concentration in the exhaust gas at a constant concentration regardless of the intake air amount GA, it is necessary that the hydrocarbon feed amount be increased as the intake air amount GA increases. Therefore, in this embodiment according to the present invention, as shown in FIG. 17, the more the intake air amount GA increases, the more the injection amount of hydrocarbons W is increased.

Figure 18:
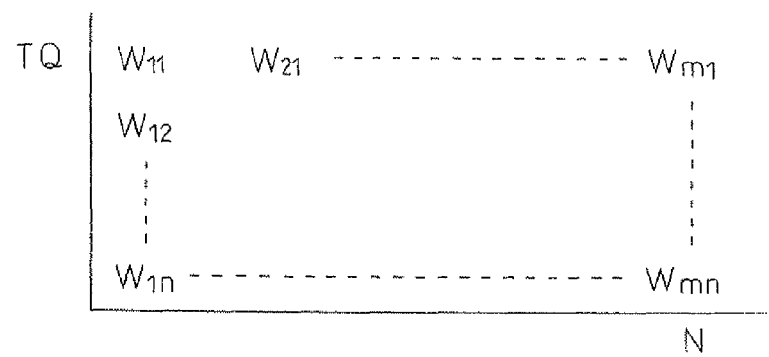
FIG. 18 is a view showing a map of the hydrogen feed amount W.

The injection amount of hydrocarbons W enabling the optimum concentration of hydrocarbons in accordance with the engine operating state to be obtained in this way changes in accordance with the operating state of the engine. In this embodiment according to the present invention, the injection amount of hydrocarbons W is stored as a function of the demanded torque TQ of the engine and the engine speed N in the form of a map such as shown in FIG. 18 in advance in the ROM 32.

Figure 19:
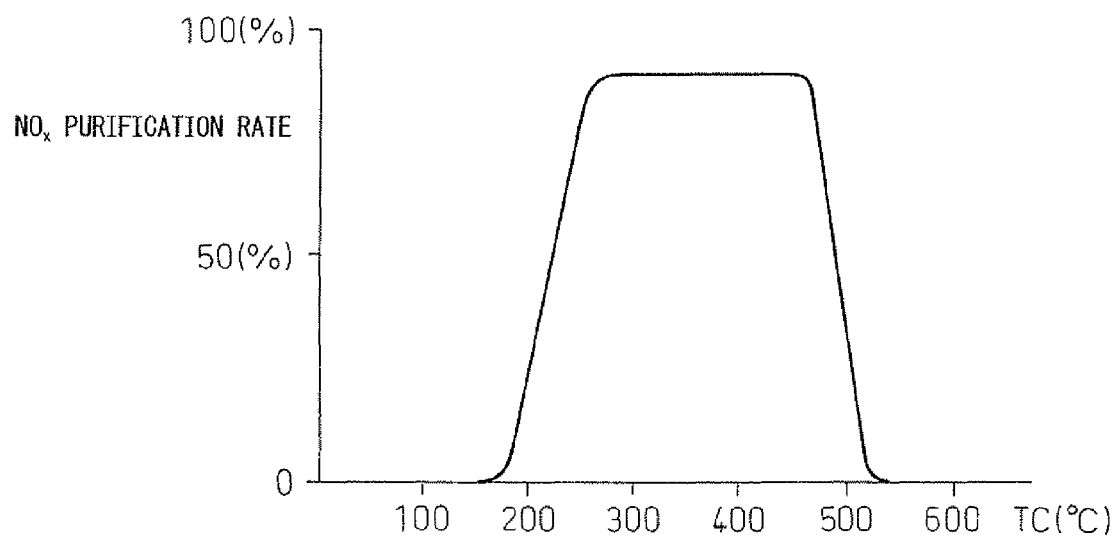
FIG. 19 is a view showing an $NO_x$ purification rate.

FIG. 19 shows the $NO_x$ purification rate when feeding aqueous urea solution sufficient for reducing the $NO_x$ which is contained in exhaust gas from the aqueous urea solution feed valve 17 and reducing the $NO_x$ which is contained in the exhaust gas at the $NO_x$ selective reduction catalyst 15. As will be understood from FIG. 19, this $NO_x$ selective reduction catalyst 15 becomes activated resulting in the $NO_x$ purification rate becoming higher if the temperature of the $NO_x$ selective reduction catalyst 15 exceeds about 200° C. The $NO_x$ purification method which uses the ammonia produced from the aqueous urea solution in this way to reduce the $NO_x$ which is contained in exhaust gas at the $NO_x$ selective reduction catalyst 15 will be referred to as the second $NO_x$ purification method below.

Figure 20:
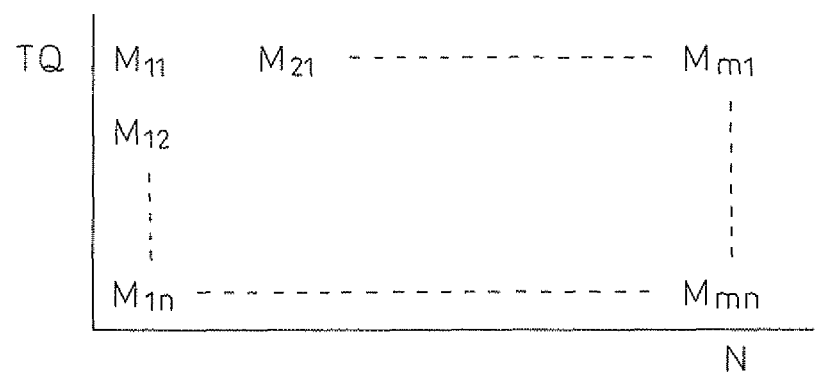
FIG. 20 is a view showing a map of the aqueous urea solution feed amount.

When using this second $NO_x$ purification method to perform the $NO_x$ purification action, the injection amount M of the aqueous urea solution required for reducing the $NO_x$ which is contained in exhaust gas changes in accordance with the operating state of the engine. In this embodiment according to the present invention, this injection amount M of the aqueous urea solution is stored as a function of the demanded torque TQ and the engine speed N of the engine in the form of a map such as shown in FIG. 20 in advance in the ROM 32.

In the present invention, an exhaust purification catalyst 13 for reacting $NO_x$ contained in exhaust gas and reformed hydrocarbons is arranged inside of an engine exhaust passage, aqueous urea solution feeding means 17 and an $NO_x$ selective reduction catalyst 15 for reducing the $NO_x$ by ammonia derived from the aqueous urea solution are arranged inside of an engine exhaust passage downstream of the exhaust purification catalyst 13, and, at the time of engine operation, either method of a first $NO_x$ purification method which makes the concentration of hydrocarbons flowing into the exhaust purification catalyst 13 vibrate by within the predetermined range of amplitude and within the predetermined range of period so as to reduce the $NO_x$ which is contained in exhaust gas in the exhaust purification catalyst and a second $NO_x$ purification method which uses the ammonia derived from the fed aqueous urea solution to reduce the $NO_x$ which is contained in exhaust gas at the $NO_x$ selective reduction catalyst 15 is selectively used.

Figure 21:
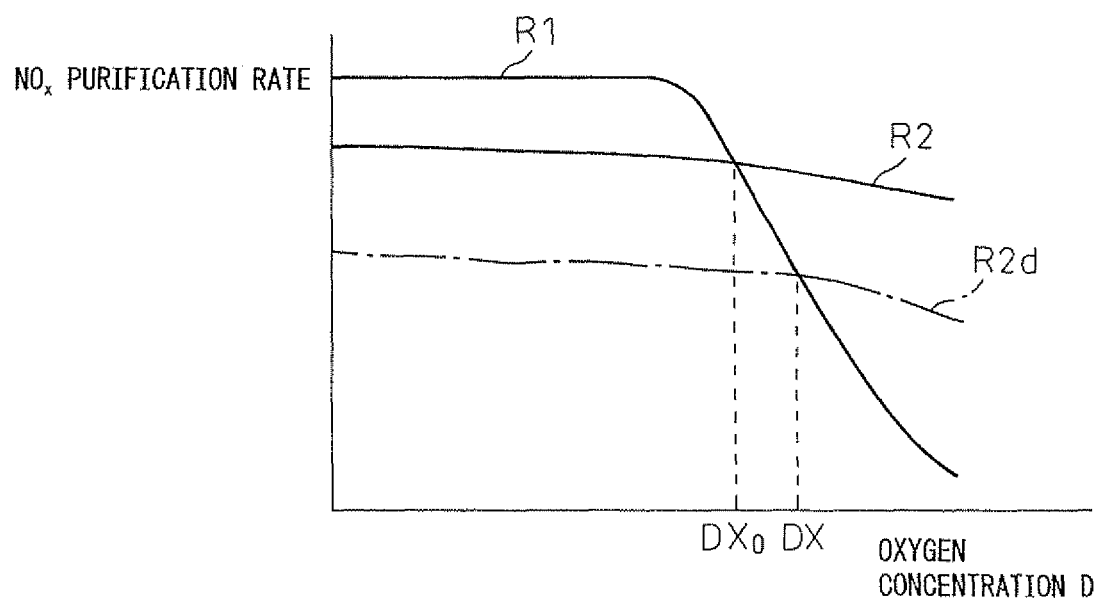
FIG. 21 is a view showing a relationship between an $NO_x$ purification rate and an oxygen concentration D.

Next, this will be explained in a bit more detail while referring to FIG. 21. FIG. 21 shows the relationship between the $NO_x$ purification rate and the oxygen concentration D in the exhaust gas. Note that, in FIG. 21, R1 shows the $NO_x$ purification rate when the first $NO_x$ purification method is used for the $NO_x$ purification action, while R2 shows the $NO_x$ purification rate when an aqueous urea solution of a predetermined prescribed concentration is used with the second $NO_x$ purification method for the $NO_x$ purification action.

Now, as explained above, to remove the $NO_x$ well, as shown in FIG. 16, as the base air-fuel ratio $(A/F)_b$ becomes higher, that is, as the oxygen concentration D in the exhaust gas becomes higher, the amplitude of the hydrocarbon concentration has to be increased. To increase the amplitude of the hydrocarbon concentration, it is necessary to increase the injection amount of hydrocarbons W. Therefore, in this embodiment according to the present invention, the injection amount of hydrocarbons W is made to increase as the oxygen concentration D of the exhaust gas becomes higher. However, if the oxygen concentration D of the exhaust gas becomes higher by a certain extent or more, even if increasing the injection amount of hydrocarbons W, the air-fuel ratio (A/F) in can no longer be reduced to the demanded minimum air-fuel ratio X. Therefore, as shown in FIG. 21, the $NO_x$ purification rate R1 falls as the oxygen concentration D becomes higher if the oxygen concentration D in the exhaust gas becomes larger by a certain extent or more.

As opposed to this, the second $NO_x$ purification method using the aqueous urea solution is not affected much by the oxygen concentration D in the exhaust gas. Therefore, the $NO_x$ purification rate R2 does not fall much even if the oxygen concentration D increases. In this regard, when a good $NO_x$ purification action is being performed, the $NO_x$ purification rate R1 by the first $NO_x$ purification method is higher than the $NO_x$ purification rate R2 by the second $NO_x$ purification method. However, if the oxygen concentration D in the exhaust gas becomes higher, the $NO_x$ purification rate R1 falls, therefore, as shown in FIG. 21, if the oxygen concentration D in the exhaust gas becomes the oxygen concentration $DX_0$ or more, the $NO_x$ purification rate R2 by the second $NO_x$ purification method becomes higher than the $NO_x$ purification rate R1 by the first $NO_x$ purification method.

Therefore, to obtain a high $NO_x$ purification rate regardless of the oxygen concentration D in the exhaust gas, when the oxygen concentration D in the exhaust gas is lower than $DX_0$, it is preferable to use the first $NO_x$ purification method, while when the oxygen concentration D in the exhaust gas is higher than $DX_0$, it is preferable to use the second $NO_x$ purification method. Therefore, in this embodiment according to the present invention, the second $NO_x$ purification method is used in an engine operating region of a high oxygen concentration D in the exhaust gas compared with the first $NO_x$ purification method. If the oxygen concentration in the exhaust gas becomes higher, the $NO_x$ purification method is switched from the first $NO_x$ purification method to the second $NO_x$ purification method.

That is, in this embodiment, the engine operating region where the first $NO_x$ purification method is used for the $NO_x$ purification action is an engine operating region where a higher $NO_x$ purification rate is obtained by the first $NO_x$ purification method than by the second $NO_x$ purification method, while the engine operating region where the second $NO_x$ purification method is used for the $NO_x$ purification action is an engine operating region where a higher $NO_x$ purification rate is obtained by the second $NO_x$ purification method than by the first $NO_x$ purification method.

Figure 22:
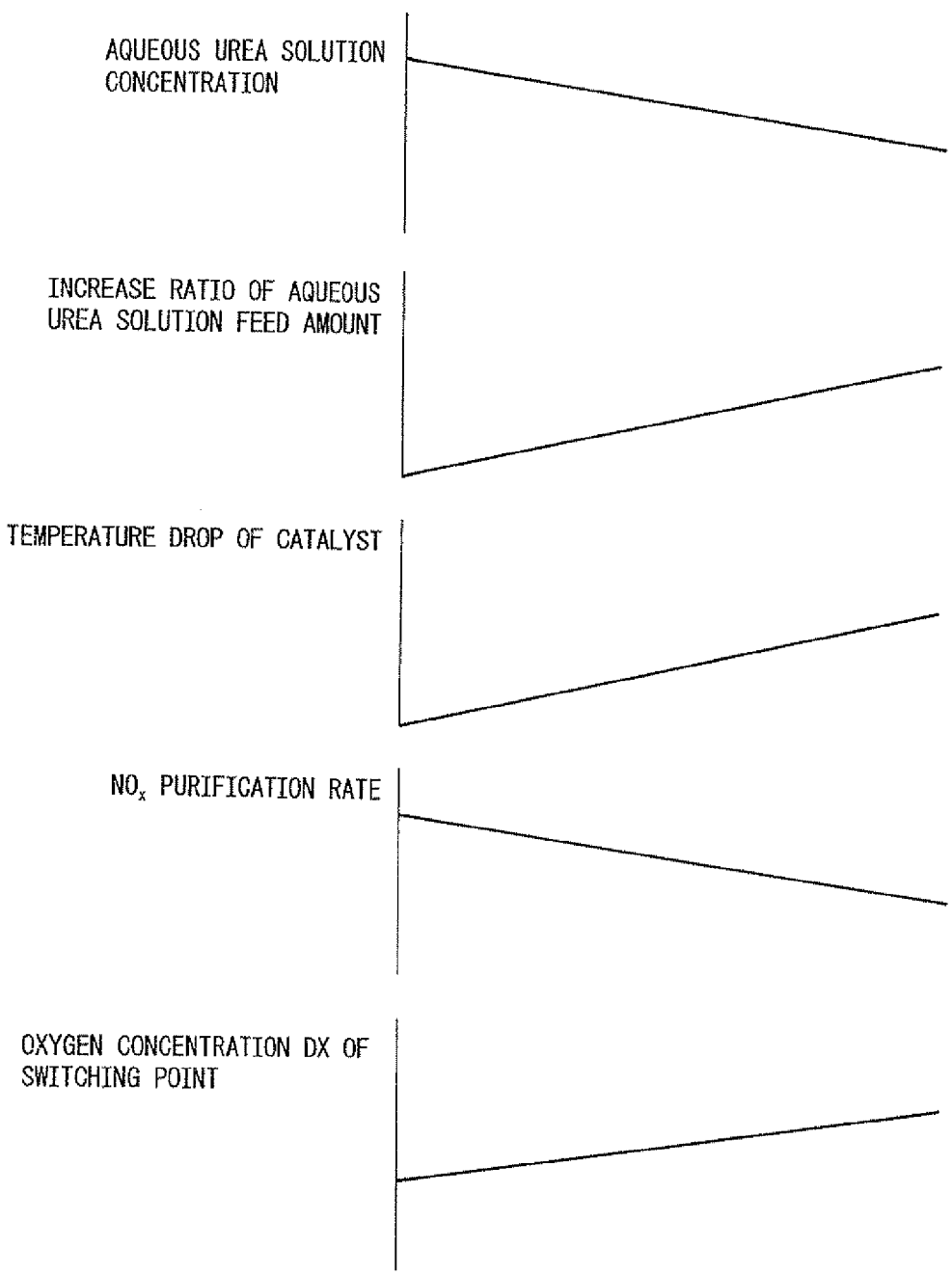
FIG. 22 is a view showing changes in various values when an aqueous urea solution concentration changes.

In this regard, in the embodiment according to the present invention, if the concentration of the aqueous urea solution which is stored in the aqueous urea solution tank 20 falls, the feed amount of the aqueous urea solution is increased so as to maintain the amount of urea in the aqueous urea solution which is fed from the aqueous urea solution feed valve 17 at the amount necessary for reducing the $NO_x$. That is, in this embodiment according to the present invention, as shown in FIG. 22, if the concentration of the aqueous urea solution falls, the ratio of increase of the aqueous urea solution feed amount is increased. If the ratio of increase of the aqueous urea solution feed amount is increased, the latent heat of evaporation of the aqueous urea solution causes the amount of heat robbed from the $NO_x$ selective reduction catalyst 15 to increase. Therefore, as shown in FIG. 22, the temperature drop in the $NO_x$ selective reduction catalyst 15 is increased.

If the temperature drop of the $NO_x$ selective reduction catalyst 15 increases, as shown in FIG. 22, the $NO_x$ purification rate when using the second $NO_x$ purification method falls. That is, the $NO_x$ purification rate falls from R2 to R2d as shown in FIG. 21. If the NO purification rate falls, regardless of the oxygen concentration D in the exhaust gas, the switching point (oxygen concentration DX) of the $NO_x$ purification method for obtaining a high $NO_x$ purification rate moves to the high side of the oxygen concentration D. As shown in FIG. 22, the oxygen concentration DX at this switching point becomes higher the more the aqueous urea solution concentration falls.

In this regard, the concentration of the aqueous urea solution which is stored in the aqueous urea solution tank 20 may be detected by an aqueous urea solution concentration sensor, but the concentration of the aqueous urea solution may also be estimated by other methods. That is, urea evaporates from the aqueous urea solution in the aqueous urea solution tank 20 in the form of ammonia, so the concentration of the aqueous urea solution gradually falls along with the elapse of time. Therefore, the longer the elapsed time from the resupply of the aqueous urea solution tank 20 with the aqueous urea solution or the more the amount of aqueous urea solution in the aqueous urea solution tank 20 is reduced, the concentration of the aqueous urea solution falls. Therefore, the aqueous urea solution concentration can be estimated from the time elapsed when resupplying the aqueous urea solution tank 20 with the aqueous urea solution or from the amount of aqueous urea solution in the aqueous urea solution tank 20.

Therefore, in one embodiment of the present invention, the amount of aqueous urea solution in the aqueous urea solution tank 20 is used as the basis to control the $NO_x$ purification method. The feature in this case is, as will be understood from FIG. 21, if the amount of aqueous urea solution in the aqueous urea solution tank 20 falls, the region of the oxygen concentration D where the first $NO_x$ purification method is used becomes broader. This means that it is possible to suppress consumption of the aqueous urea solution when the amount of aqueous urea solution in the aqueous urea solution tank 20 decreases.

That is, in this embodiment, if the aqueous urea solution which is stored inside the aqueous urea solution tank 20 is decreased, the operating region where the first $NO_x$ purification method is used for the $NO_x$ purification action is enlarged and the engine operating region where the second $NO_x$ purification method is used for the $NO_x$ purification action is reduced.

In this regard, in the example shown in FIG. 21, the boundary between the engine operating region where the first $NO_x$ purification method is used for the $NO_x$ purification action and the engine operating region where the second $NO_x$ purification method is used for the $NO_x$ purification is determined by the magnitude of the oxygen concentration D. However, this boundary may also be determined by the magnitude of the air-fuel ratio of the exhaust gas flowing into the $NO_x$ selective reduction catalyst 15. Further, it is also possible to detect the $NO_x$ purification rates by the first $NO_x$ purification method and second $NO_x$ purification method and determine the boundary so as to give the $NO_x$ purification rate of the higher $NO_x$ purification rate.

There are various methods for determination of the boundary between the engine operating region where the first $NO_x$ purification method is used for the $NO_x$ purification action and the engine operating region where the second $NO_x$ purification method is used for the $NO_x$ purification. In this embodiment, the remaining amount of the aqueous urea solution which is stored in the aqueous urea solution tank 20 is used as the basis to determine the boundary between the engine operating region where the first $NO_x$ purification method is used for the $NO_x$ purification action and the engine operating region where the second $NO_x$ purification method is used for the $NO_x$ purification. If the remaining amount of the aqueous urea solution which is stored in the aqueous urea solution tank 20 is decreased, the above-mentioned boundary is made to move in a direction reducing the engine operating region where the second $NO_x$ purification method is used for the $NO_x$ purification.

In this case, in the example shown in FIG. 21, the oxygen concentration in the exhaust gas is used as the value showing the above-mentioned boundary. If the remaining amount of the aqueous urea solution which is stored in the aqueous urea solution tank 20 is decreased, the above boundary is made to move in a direction where the oxygen concentration D in the exhaust gas in high. If the oxygen concentration in the exhaust gas exceeds the above boundary, the $NO_x$ purification method is switched from the first $NO_x$ purification method to the second $NO_x$ purification method.

On the other hand, as explained above, it is also possible to provide an aqueous urea solution concentration estimating means such as an aqueous urea solution concentration sensor for estimating the concentration of the aqueous urea solution which is fed from the aqueous urea solution feeding means 17. In this case, if the concentration of the aqueous urea solution which is estimated by this aqueous urea solution concentration estimating means falls, the engine operating region where the first $NO_x$ purification method is used for the $NO_x$ purification action is enlarged and the engine operating region where the second $NO_x$ purification method is used for the $NO_x$ purification action is reduced.

Explaining this a bit more specifically, the concentration of the aqueous urea solution which is estimated by the aqueous urea solution concentration estimating means is used as the basis to determine the boundary between the engine operating region where the first $NO_x$ purification method is used for the $NO_x$ purification action and the engine operating region where the second $NO_x$ purification method is used for the $NO_x$ purification. If the concentration of the aqueous urea solution which is estimated by this aqueous urea solution concentration estimating means falls, the above boundary is made to move in a direction where the engine operating region where the second $NO_x$ purification method is used for the $NO_x$ purification action is reduced.

Next, the case of using the remaining amount of the aqueous urea solution in the aqueous urea solution tank as the basis to control the $NO_x$ purification method will be explained with reference to FIG. 23 and FIG. 24.

Figure 23:
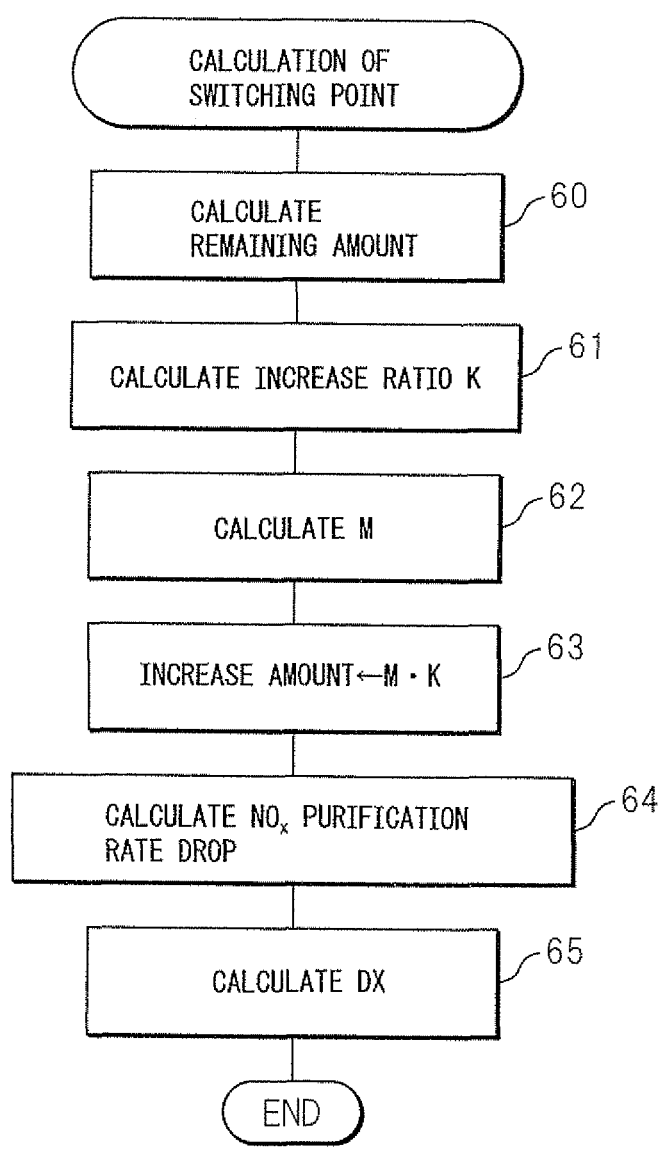
FIG. 23 is a flow chart for calculating a switching point.

FIG. 23 shows the routine for calculating the switching point of the $NO_x$ purification method. This routine is executed by interruption every predetermined time.

Referring to FIG. 23, first, at step 60, the remaining amount of the aqueous urea solution in the aqueous urea solution tank 20 is calculated based on the output signal of the level sensor 28. Next, at step 61, the increase ratio K of the aqueous urea solution to be fed is calculated from this remaining amount of the aqueous urea solution. Next, at step 62, the injection amount M of the aqueous urea solution is calculated from the map shown in FIG. 20. Next, at step 63, the increase (M·K) of the injection amount of the aqueous urea solution is calculated. Next, at step 64, this increase (M·K) is used as the basis to calculate the drop in the $NO_x$ purification rate due to the second $NO_x$ purification method. Next, the oxygen concentration DX showing the switching point of the $NO_x$ purification rate is calculated from the drop in this $NO_x$ purification rate.

FIG. 24 shows the exhaust purification routine performed based on this oxygen concentration DX. This routine is also executed every constant time.

Referring to FIG. 24, first, at step 70, the oxygen concentration D in the exhaust gas is detected by the oxygen concentration sensor 29. Next, at step 71, it is judged if the oxygen concentration D in the exhaust gas is higher than the oxygen concentration DX showing the switching point. When D≤DX, the routine proceeds to step 72 where the injection amount of hydrocarbons W is calculated from the map shown in FIG. 18. Next, at step 73, the hydrocarbons are fed from the hydrocarbon feed valve 16. At this time, the first $NO_x$ purification method is used for the $NO_x$ purification action.

As opposed to this, when it is judged at step 71 that D>DX, the routine proceeds to step 74 where the injection amount M of the aqueous urea solution is calculated from the map shown in FIG. 20. Next, at step 75, the output signal of the level sensor 28 is used as the basis to calculate the remaining amount of the aqueous urea solution in the aqueous urea solution tank 20. Next, at step 76, the increase ratio K of the aqueous urea solution to be fed is calculated from the remaining amount of this aqueous urea solution. Next, at step 77, the injection amount M f (=M·(1+K)) of the aqueous urea solution is calculated. Next, at step 78, the aqueous urea solution is injected from the aqueous urea solution injector 17. At this time, the second $NO_x$ purification method is used to perform the $NO_x$ purification action.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12, 14 . . . exhaust pipe
13 . . . exhaust purification catalyst
15 . . . $NO_x$ selective reduction catalyst
16 . . . hydrocarbon feed valve
17 . . . aqueous urea solution feed valve

The invention claimed is:

1. An exhaust purification system of an internal combustion engine wherein an exhaust purification catalyst for reacting $NO_x$ contained in exhaust gas and reformed hydrocarbons is arranged inside of an engine exhaust passage, aqueous urea solution feeding means and an $NO_x$ selective reduction catalyst able to reduce $NO_x$ by ammonia derived from an aqueous urea solution fed are arranged inside of the engine exhaust passage downstream of the exhaust purification catalyst, a precious metal catalyst is carried on an exhaust gas flow surface of the exhaust purification catalyst and a basic exhaust gas flow surface part is formed amount the previous metal catalyst, the exhaust purification catalyst has a property of reducing the $NO_x$ which is contained in exhaust gas if a concentration of hydrocarbons flowing into the exhaust purification catalyst is made to vibrate by within a predetermined range of amplitude and within a predetermined range of period and has a property of being increased in storage amount of $NO_x$ which is contained in exhaust gas if the vibration period of the hydrocarbon concentration is made longer than the predetermined range, and, at the time of engine operation, either method of a first $NO_x$ purification method which makes the concentration of hydrocarbons flowing into the exhaust purification catalyst vibrate by within the predetermined range of amplitude and within the predetermined range of period so as to reduce the $NO_x$ which is contained in exhaust gas in the exhaust purification catalyst and a second $NO_x$ purification method which uses the ammonia derived from the fed aqueous urea solution to reduce the $NO_x$ which is contained in exhaust gas at the $NO_x$ selective reduction catalyst is selectively used.

2. An exhaust purification system of an internal combustion engine as claimed in claim 1, wherein said second $NO_x$ purification method is used in an engine operating region where an oxygen concentration in the exhaust gas is higher compared with said first $NO_x$ purification method, therefore if the oxygen concentration in the exhaust gas becomes high, an $NO_x$ purification method is switched from the first $NO_x$ purification method to the second $NO_x$ purification method.

3. An exhaust purification system of an internal combustion engine as claimed in claim 2, wherein the engine operating region where the first $NO_x$ purification method is used for the $NO_x$ purification action is an engine operating region where a higher $NO_x$ purification rate is obtained by the first $NO_x$ purification method than by the second $NO_x$ purification method, while the engine operating region where the second $NO_x$ purification method is used for the $NO_x$ purification action is an engine operating region where a higher $NO_x$ purification rate is obtained by the second $NO_x$ purification method than by the first $NO_x$ purification method.

4. An exhaust purification system of an internal combustion engine as claimed in claim 1, wherein an aqueous urea solution tank storing the aqueous urea solution to be fed is provided and wherein if the aqueous urea solution which is stored inside the aqueous urea solution tank is decreased, an operating region where the first $NO_x$ purification method is used for the $NO_x$ purification action is enlarged and an engine operating region where the second $NO_x$ purification method is used for the $NO_x$ purification action is reduced.

5. An exhaust purification system of an internal combustion engine as claimed in claim 4, wherein a remaining amount of the aqueous urea solution which is stored in the aqueous urea solution tank is used as the basis to determine a boundary between the engine operating region where the first $NO_x$ purification method is used for the $NO_x$ purification and the engine operating region where the second $NO_x$ purification method is used for the $NO_x$ purification and wherein if the remaining amount of the aqueous urea solution which is stored in the aqueous urea solution tank is decreased, the boundary is made to move in a direction reducing the engine operating region where the second $NO_x$ purification method is used for the $NO_x$ purification.

6. An exhaust purification system of an internal combustion engine as claimed in claim 5, wherein said second $NO_x$ purification method is used in an engine operating region where an oxygen concentration in the exhaust gas is high compared with said first $NO_x$ purification method, the oxygen concentration in the exhaust gas is used as a value showing said boundary, if the remaining amount of the aqueous urea solution which is stored in the aqueous urea solution tank is decreased, said boundary is made to move in a direction where the oxygen concentration in the exhaust gas in high, and if the oxygen concentration in the exhaust gas exceeds said boundary, an $NO_x$ purification method is switched from the first $NO_x$ purification method to the second $NO_x$ purification method.

7. An exhaust purification system of an internal combustion engine as claimed in claim 5, wherein the engine operating region where the first $NO_x$ purification method is used for the $NO_x$ purification action is an engine operating region where a higher $NO_x$ purification rate is obtained by the first $NO_x$ purification method than by the second $NO_x$ purification method, while the engine operating region where the second $NO_x$ purification method is used for the $NO_x$ purification action is an engine operating region where a higher $NO_x$ purification rate is obtained by the second $NO_x$ purification method than by the first $NO_x$ purification method.

8. An exhaust purification system of an internal combustion engine as claimed in claim 1, wherein aqueous urea solution concentration estimating means for estimating a concentration of the aqueous urea solution which is fed from said aqueous urea solution feeding means is provided and wherein if the concentration of the aqueous urea solution which is estimated by the aqueous urea solution concentration estimating means falls, an engine operating region where the first $NO_x$ purification method is used for the $NO_x$ purification action is enlarged and an engine operating region where the second $NO_x$ purification method is used for the $NO_x$ purification action is reduced.

9. An exhaust purification system of an internal combustion engine as claimed in claim 8, wherein the concentration of the aqueous urea solution which is estimated by said aqueous urea solution concentration estimating means is used as the basis to determine a boundary between the engine operating region where the first $NO_x$ purification method is used for the $NO_x$ purification action and the engine operating region where the second $NO_x$ purification method is used for the $NO_x$ purification and wherein if the concentration of the aqueous urea solution which is estimated by said aqueous urea solution concentration estimating means falls, said boundary is made to move in a direction where the engine operating region where the second $NO_x$ purification method is used for the $NO_x$ purification action is reduced.

10. An exhaust purification system of an internal combustion engine as claimed in claim 1, wherein $NO_x$ contained in exhaust gas and reformed hydrocarbons react in the exhaust purification catalyst whereby a reducing intermediate containing nitrogen and hydrocarbons is produced and wherein a vibration period of the hydrocarbon concentration is a vibration period necessary for the continued production of the reducing intermediate.

11. An exhaust purification system of an internal combustion engine as claimed in claim 10, wherein said vibration period of the hydrocarbon concentration is from 0.3 second to 5 seconds.

* * * * *